United States Patent
Sato et al.

(10) Patent No.: US 12,192,648 B2
(45) Date of Patent: Jan. 7, 2025

(54) IMAGE PROCESSING DEVICE, METHOD FOR TRAINING MACHINE LEARNING MODEL, IDENTIFICATION DEVICE, AND IMAGE PROCESSING METHOD

(71) Applicant: Panasonic Intellectual Property Corporation of America, Torrance, CA (US)

(72) Inventors: Satoshi Sato, Kyoto (JP); Yasunori Ishii, Osaka (JP); Sotaro Tsukizawa, Osaka (JP); Changxin Zhou, Singapore (SG); Takrit Tanasnitikul, Singapore (SG); Pongsak Lasang, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 166 days.

(21) Appl. No.: 18/109,351

(22) Filed: Feb. 14, 2023

(65) Prior Publication Data
US 2023/0199327 A1   Jun. 22, 2023

Related U.S. Application Data

(63) Continuation of application No. PCT/JP2021/030372, filed on Aug. 19, 2021.
(Continued)

(30) Foreign Application Priority Data

Mar. 22, 2021 (JP) .................................. 2021-047065

(51) Int. Cl.
*H04N 23/80* (2023.01)
*G06F 21/62* (2013.01)
(Continued)

(52) U.S. Cl.
CPC ......... *H04N 23/80* (2023.01); *G06F 21/6254* (2013.01); *G06V 10/774* (2022.01);
(Continued)

(58) Field of Classification Search
CPC ...... H04N 23/55; H04N 23/61; H04N 23/611; H04N 23/617; H04N 23/64; H04N 23/667;
(Continued)

(56) References Cited

U.S. PATENT DOCUMENTS 9,264,265 B1* 2/2016 Wei .................... H04L 25/03299
2004/0028256 A1* 2/2004 Murakami .............. G06T 1/005
382/100
(Continued)

FOREIGN PATENT DOCUMENTS

JP            3919613        5/2007

OTHER PUBLICATIONS

International Search Report issued Nov. 16, 2021 in International (PCT) Application No. PCT/JP2021/030372.

*Primary Examiner* — Twyler L Haskins
*Assistant Examiner* — Akshay Trehan
(74) *Attorney, Agent, or Firm* — Wenderoth, Lind & Ponack, L.L.P.

(57) ABSTRACT

An image processing device includes a noise adder that obtains a captured image from an image capturing device including a mask having at least one aperture, an MPH information obtainer that obtains aperture pattern information corresponding to the pattern of the at least one aperture, the noise adder that adds, to the captured image, noise determined according to the aperture pattern information, and a transmitter that outputs the noise added captured image.

11 Claims, 10 Drawing Sheets

Related U.S. Application Data

(60) Provisional application No. 63/071,155, filed on Aug. 27, 2020.

(51) Int. Cl.
| | |
|---|---|
| *G06T 7/00* | (2017.01) |
| *G06V 10/774* | (2022.01) |
| *G06V 10/82* | (2022.01) |
| *G06V 40/16* | (2022.01) |
| *H04N 23/55* | (2023.01) |
| *H04N 23/617* | (2023.01) |
| *H04N 23/95* | (2023.01) |
| *H04N 23/955* | (2023.01) |
| *H04N 25/60* | (2023.01) |

(52) U.S. Cl.
CPC .............. *G06V 10/82* (2022.01); *H04N 23/55* (2023.01); *H04N 23/617* (2023.01); *H04N 23/95* (2023.01); *H04N 23/955* (2023.01); *H04N 25/60* (2023.01); *G06T 7/00* (2013.01); *G06V 40/172* (2022.01)

(58) Field of Classification Search
CPC ...... H04N 23/95; H04N 23/955; H04N 23/80; H04N 25/60; G06F 21/6254; G06V 10/774; G06V 10/82; G06V 40/172; G06T 7/00

See application file for complete search history.

(56) References Cited

U.S. PATENT DOCUMENTS

| | | | |
|---|---|---|---|
| 2009/0095912 A1* | 4/2009 | Slinger ................ | H04N 23/951 250/363.06 |
| 2014/0307090 A1* | 10/2014 | Kobayashi ....... | H04N 21/23476 348/143 |
| 2016/0105598 A1* | 4/2016 | Zeira ..................... | H04N 23/51 348/143 |
| 2018/0063509 A1* | 3/2018 | Koppal ................ | H04N 13/239 |
| 2019/0347520 A1* | 11/2019 | Sato ....................... | G06V 20/10 |
| 2020/0211201 A1* | 7/2020 | Chiang ................ | G06T 11/001 |
| 2021/0385412 A1* | 12/2021 | Matula .................... | H04N 7/15 |

* cited by examiner

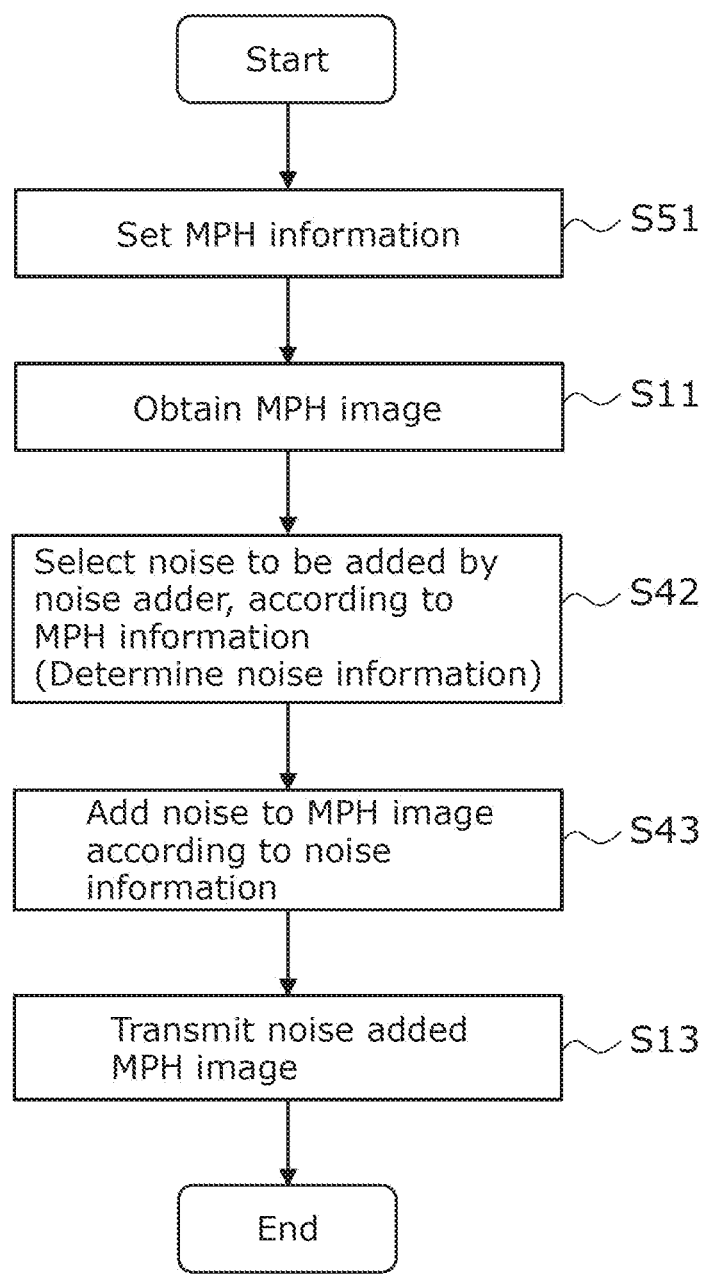

IMAGE PROCESSING DEVICE, METHOD FOR TRAINING MACHINE LEARNING MODEL, IDENTIFICATION DEVICE, AND IMAGE PROCESSING METHOD

CROSS REFERENCE TO RELATED APPLICATIONS

This is a continuation application of PCT International Application No. PCT/JP2021/030372 filed on Aug. 19, 2021, designating the United States of America, which is based on and claims priority of U.S. Provisional Patent Application No. 63/071,155 filed on Aug. 27, 2020, and Japanese Patent Application No. 2021-047065 filed on Mar. 22, 2021. The entire disclosures of the above-identified applications, including the specifications, drawings and claims are incorporated herein by reference in their entirety.

FIELD

The present disclosure relates to an image processing device, a method for training a machine learning model, an identification device, and an image processing method.

BACKGROUND

In recent years, image processing techniques to prevent unauthorized use of an image have been under research and development. Addition of noise to an image is an example of image processing. Patent Literature 1 discloses a technique to add noise for each pixel according to addition information indicating which one of first noise addition processing and second noise addition processing is to be performed.

CITATION LIST

Patent Literature

PTL 1: Japanese Patent No. 3919613

SUMMARY

Technical Problem

However, in the technique disclosed in Patent Literature 1, an original image may be restored from a processed image. For instance, noise added to an image may be removed.

In view of this, the present disclosure provides an image processing device, a method for training a machine learning model, an identification device, and an image processing method that can suppress image restoration from a noise added image.

Solution to Problem

An image processing device according to one aspect of the present disclosure includes an image obtainer that obtains a first captured image from a first image capturing device including a mask including at least one aperture, an information obtainer that obtains aperture pattern information corresponding to the pattern of the at least one aperture, a noise adder that adds, to the first captured image, noise determined according to the aperture pattern information, and an outputting unit that outputs the first captured image to which the noise is added.

A method for training a machine learning model, according to another aspect of the present disclosure includes obtaining a dataset including an image generated by adding noise to a captured image obtained from an image capturing device including a mask including at least one aperture, the noise being determined according to aperture pattern information corresponding to the pattern of the at least one aperture and training the machine learning model by using the dataset obtained.

An identification device according to still another aspect of the present disclosure includes an image obtainer that obtains the first captured image to which the noise is added, from the image processing device described above and an identifying unit that identifies an object shown in the first captured image to which the noise is added, by using a machine learning model trained using a dataset including an image generated by adding noise determined according to the aperture pattern information to a second captured image obtained from a second image capturing device including the mask.

An image processing method according to still another aspect of the present disclosure includes obtaining a captured image from an image capturing device including a mask including at least one aperture, obtaining aperture pattern information corresponding to the pattern of the at least one aperture, adding, to the captured image, noise determined according to the aperture pattern information, and outputting the captured image to which the noise is added.

Advantageous Effects

The image processing device, the method for training the machine learning model, the identification device, and the image processing method according to some aspects of the present disclosure can suppress image restoration from a noise added image.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a flowchart illustrating operation of the sensing device according to the variation of Embodiment 2.

DESCRIPTION OF EMBODIMENTS

Circumstances Leading to the Present Disclosure

Figure 1:
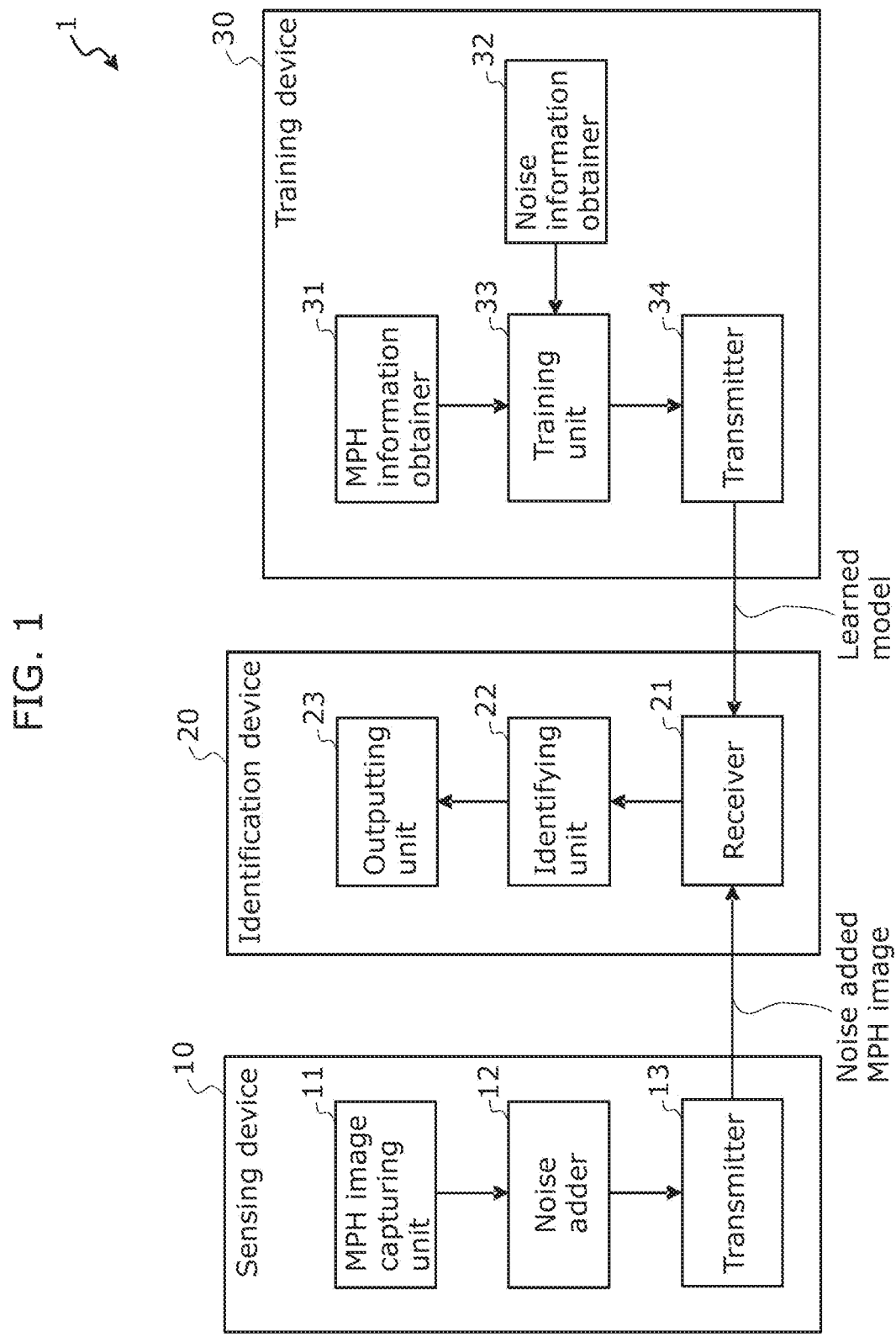
FIG. 1 is a block diagram illustrating a functional configuration of an information processing system according to Embodiment 1.

Circumstances leading to the present disclosure are described before description of the embodiments of the present disclosure.

Recent years have seen installment of cameras in many indoor and outdoor places. Thus, images containing privacy-sensitive information are more easily obtained. For instance, cameras are installed in, for example, the toilets and bathrooms of homes, eldercare facilities, or other places, cameras are mounted on machines such as drones and robots that work in privacy protection areas, or cameras are installed in, for example, convenience stores. Thus, images containing privacy-sensitive information, such as people in indoor areas, the faces of passers-by, and the license plates of automobiles, are more easily obtained.

If an image containing such privacy-sensitive information is leaked, an object, such as a person, shown in the image is exposed to the threat of privacy violation. Thus, the importance of privacy protection for an object shown in an image captured by a camera is increasing.

As with the technique disclosed in Patent Literature 1, the threat of privacy violation can be decreased by adding noise to a captured image (normal image). However, in the technique disclosed in Patent Literature 1, when a normal image itself is leaked, privacy cannot be protected.

In the present disclosure, for example, an image of an object is captured using a multi-pinhole camera, from the perspective of privacy protection of an object shown in an image. Although details are described later, an image captured by a multi-pinhole camera (multi-pinhole image or MPH image) is an image including parallax characteristics. In other words, the MPH image is a blurred image including a blur. Since an obtained image is a blurred image, it is possible to protect the privacy of an object. It should be noted that the multi-pinhole camera is a camera including a multi-pinhole mask (mask) having multiple pinholes.

However, even if the obtained image is the MPH image, when the MPH image is leaked, a deblurred image may be restored. For instance, image restoration is possible, depending on the characteristics of the mask of the camera.

In view of this, the inventors of the present application devised, for example, the image processing device described below, through diligent research on, for example, an image processing device capable of suppressing image restoration in case of leakage of an image in which privacy is already protected at the time of obtaining an MPH image or another image.

An image processing device according to one aspect of the present disclosure includes an image obtainer that obtains a first captured image from a first image capturing device including a mask including at least one aperture, an information obtainer that obtains aperture pattern information corresponding to the pattern of the at least one aperture, a noise adder that adds, to the first captured image, noise determined according to the aperture pattern information, and an outputting unit that outputs the first captured image to which the noise is added.

Thus, the noise suitable for the aperture pattern of the mask is added to the captured image. In the captured image to which such noise is added, the frequency components of the captured image and the frequency components of the noise are difficult to be separated, compared with an image to which noise is added regardless of the aperture pattern of the mask. Accordingly, the image processing device can suppress image restoration in case of leakage of a noise added image.

For instance, the noise adder may add the noise in a frequency band wider than a predetermined frequency band to the first captured image.

This causes the frequency band in which the frequency components of the noise overlap those of the captured image to be a wide frequency band. Thus, it is more difficult to separate the frequency components of the captured image from those of the noise. Accordingly, it is possible to further suppress image restoration in case of leakage of the noise added image.

For instance, the image processing device may further include a noise information determination unit that determines, according to the aperture pattern information, the noise to be added by the noise adder.

Since the noise to be added is selected from more than one type of noise according to the aperture pattern, the noise more suitable for the captured image can be added. This makes it more difficult to remove the frequency components of the noise.

For instance, the mask may be switchable between a first aperture pattern and a second aperture pattern different from the first aperture pattern, and the image processing device may further include a switcher that switches the pattern of the at least one aperture of the mask between the first aperture pattern and the second aperture pattern.

Since the aperture patterns of the mask are switched, it is possible to further suppress image restoration in case of leakage of the noise added image, compared with when the mask has only one aperture pattern.

For Instance, the noise may include at least one of salt-and-pepper noise, Laplace noise, white noise, pink noise, and noise that changes the output value of a portion of the first captured image to a fixed value.

Thus, it is possible to suppress image restoration in case of leakage of the noise added image, by just adding, to the captured image, at least one of the salt-and-pepper noise, the Laplace noise, the white noise, the pink noise, and the noise that changes the output value of a portion of the captured image to the fixed value.

For instance, when the frequency characteristics of the mask based on the pattern of the at least one aperture corresponding to the aperture pattern information represent a wide frequency band including a first band and a second band higher than the first band, the noise information determination unit may select, as the noise to be added by the noise adder, at least one of salt-and-pepper noise and noise that changes an output value of a portion of the first captured image to a fixed value. When the intensity of a frequency component of the first band is higher than the intensity of a frequency component of the second band, the noise information determination unit may select Laplace noise as the noise to be added by the noise adder.

Thus, it is possible to add, to the captured image, noise having the same frequency characteristics as the mask. Accordingly, it is possible to further suppress image restoration in case of leakage of the noise added image.

For instance, the aperture pattern information may include at least one of point spread function (PSF), the size and shape of the at least one aperture, and information on the apertures of the mask which are the at least one aperture.

Thus, it is possible to suppress image restoration in case of leakage of the noise added image, by just obtaining at least one of the PSF, the size and shape of the at least one aperture, and information on the apertures of the mask.

For instance, the first image capturing device may be one of a multi-pinhole camera, a lensless camera, and a coded aperture camera.

Thus, noise can be added to an image captured by the multi-pinhole camera, the lensless camera, or the coded aperture camera. Accordingly, it is possible to suppress image restoration in case of leakage of the image captured by the multi-pinhole camera, the lensless camera, or the coded aperture camera.

A method for training a machine learning model, according to another aspect of the present disclosure includes obtaining a dataset including an image generated by adding noise to a captured image obtained from an image capturing device including a mask including at least one aperture, the noise being determined according to aperture pattern information corresponding to the pattern of the at least one aperture and training the machine learning model by using the dataset obtained.

Thus, it is possible to create a learned model capable of accurately identifying an object even when the above noise is added.

An identification device according to still another aspect of the present disclosure includes an image obtainer that obtains the first captured image to which the noise is added, from the image processing device according to any one of claims 1 to 8 and an identifying unit that identifies an object shown in the first captured image to which the noise is added, by using a machine learning model trained using a dataset including an image generated by adding noise determined according to the aperture pattern information to a second captured image obtained from a second image capturing device including the mask.

Thus, it is possible to suppress degradation of the identification performance of the identification device for the noise added captured image. In other words, it is possible to achieve the identification device capable of accurately identifying an object even when an image showing the object is a noise added captured image.

An image processing method according to still another aspect of the present disclosure includes obtaining a captured image from an image capturing device including a mask including at least one aperture, obtaining aperture pattern information corresponding to the pattern of the at least one aperture, adding, to the captured image, noise determined according to the aperture pattern information, and outputting the captured image to which the noise is added.

Thus, the image processing method has effects similar to those of the image processing device.

It should be noted that these general or specific aspects may be embodied as a system, a device, a method, an integrated circuit, a computer program, or a non-transitory recording medium, such as a computer-readable CD-ROM, or may be embodied as any combination of the system, the device, the method, the integrated circuit, the computer program, and the recording medium.

Specific examples of, for example, the image processing device according to one aspect of the present disclosure are described below with reference to the drawings. The embodiments described below each show specific examples of the present disclosure. Accordingly, the numerical values, structural elements, steps, order of the steps, and other details described in the embodiments below are mere examples and are not intended to limit the present disclosure. In addition, the structural elements not included in the independent claims among the structural elements described in the embodiments below are described as optional structural elements.

In addition, the drawings are schematic views and are not necessarily precisely drawn. Thus, for instance, the same scale is not necessarily used in the drawings. In addition, in the drawings, substantially identical elements are assigned the same reference symbol, and overlapping explanations are omitted or simplified.

In addition, in the specification, a numerical value, a numerical value range, and a term describing a relationship between elements, like the term same, are not limited to the strict sense of the term, and a substantially equivalent range like a difference of around some percentages (e.g., around five percentages) is encompassed.

Embodiment 1

An information processing system including an image processing device according to Embodiment 1 is described below with reference to FIGS. 1 to 6.

[1-1. Configuration of Information Processing System]

Figure 2:
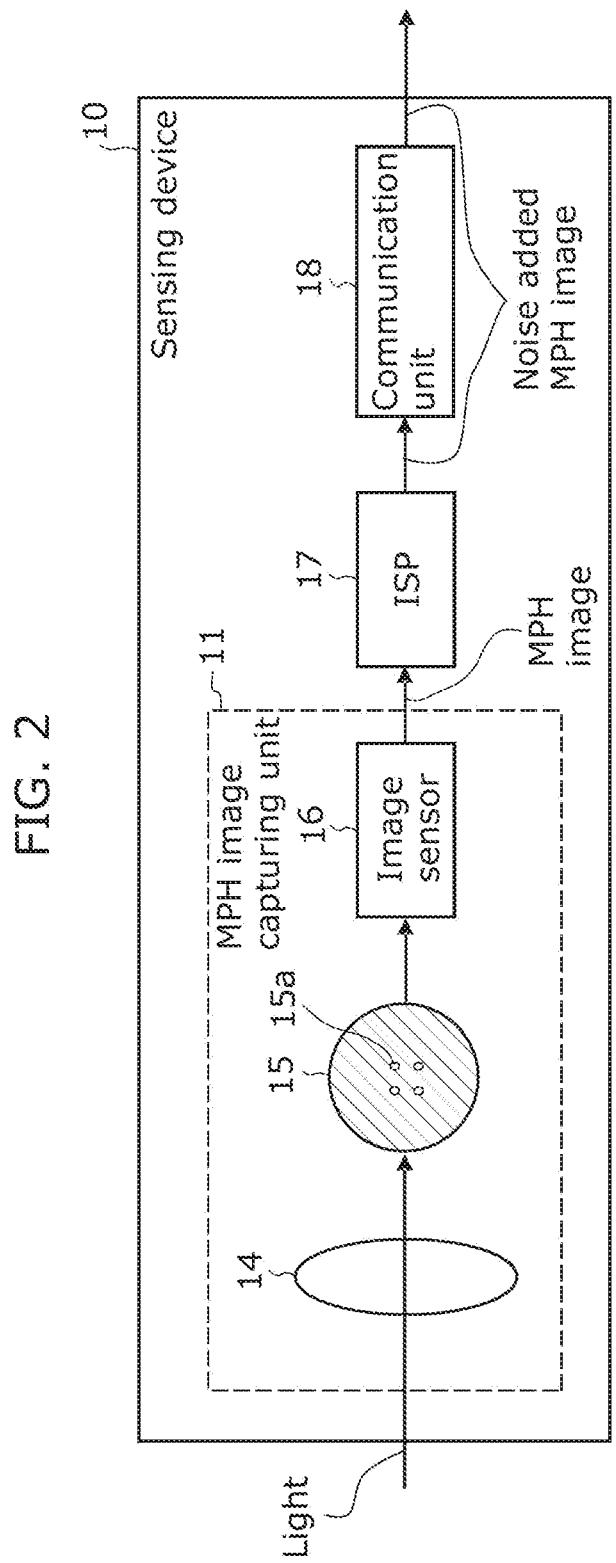
FIG. 2 is a block diagram illustrating a configuration of a sensing device according to Embodiment 1.

A configuration of the information processing system according to Embodiment 1 is described with reference to FIGS. 1 and 2. FIG. 1 is a block diagram illustrating a functional configuration of information processing system 1 according to Embodiment 1. FIG. 2 is a block diagram illustrating a configuration of sensing device 10 according to Embodiment 1. Information processing system 1 identifies an object shown in an MPH image, by using, for example, an image obtained by adding noise to the MPH image.

As illustrated in FIG. 1, information processing system 1 includes sensing device 10, identification device 20, and training device 30. Sensing device 10 and identification device 20 are communicably connected to each other. Identification device 20 and training device 30 are communicably connected to each other. Sensing device 10 and training device 30 may also be communicably connected to each other.

Sensing device 10 obtains an image in which image restoration can be suppressed in case of leakage of a noise added image. In Embodiment 1, sensing device 10 generates a predetermined-noise added MPH image as an image in which image restoration can be suppressed.

Sensing device 10 includes MPH image capturing unit 11, noise adder 12, and transmitter 13. At least noise adder 12 and transmitter 13 are included to achieve an information processing device (image processing device) for performing image processing.

MPH image capturing unit 11 obtains a privacy-protected image. In Embodiment 1, MPH image capturing unit 11 obtains an MPH image as a privacy-protected image. MPH image capturing unit 11 includes multi-pinhole mask 15 having multiple pinholes 15a and can obtain, by a one-time imaging operation, a superimposed image of images (pinhole (PH) images) having different viewpoints on an object (subject). An image obtained by MPH image capturing unit 11 performing an imaging operation is already a privacy-protected image. In other words, MPH image capturing unit 11 does not obtain a normal image in which privacy is not protected.

Thus, it is possible to suppress the violation of the privacy of the object due to the leakage of a normal image itself in which privacy is not protected. It should be noted that hereinafter, multi-pinhole mask 15 is also referred to as MPH mask 15. In addition, MPH image capturing unit 11 is an example of an image capturing device. Multi-pinhole mask 15 is an example of a mask. The MPH image is an example of a captured image.

It should be noted that the normal image is an image captured by a normal image capturing device without MPH mask 15 and an image obtained by forming an image of the light from the object, which is collected by an optical system. The optical system is an example of a lens. In an environment where an object is present, when people directly look at the object, they perceive the object in almost the same state as they see in the normal image. In other words, people visually perceive the normal image captured by the normal image capturing device in a similar way as they visually perceive the state of the real space. The normal image capturing device is, for example, a camera including a lens.

As illustrated in FIG. 2, MPH image capturing unit 11 includes, for example, lens 14, MPH mask 15, and image sensor 16. MPH image capturing unit 11 is, for example, a multi-pinhole camera. It should be noted that MPH image capturing unit 11 is not limited to the multi-pinhole camera and may be, for example, a lensless camera or a coded-aperture camera.

Lens 14 focuses incident light on image sensor 16. Lens 14 is, for example, a convex lens.

MPH mask 15 is a mask having multiple pinholes 15a (multiple pinholes). MPH mask 15 is disposed a predetermined distance apart from image sensor 16 to be closer to the object than image sensor 16 is. MPH mask 15 is disposed, for example, between lens 14 and image sensor 16. However, the position of MPH mask 15 is not limited to the position. That is, light which has passed through MPH mask 15 enters image sensor 16. Pinhole 15a is an example of an aperture.

In addition, multiple pinholes 15a are arranged at irregular or regular intervals. The size and shape of pinhole 15a, the positions and number of pinholes 15a formed in MPH mask 15, and the distance between adjacent pinholes 15a are examples of aperture pattern information corresponding to an aperture pattern (a mask pattern). The aperture pattern information includes at least one of the size and shape of pinhole 15a, the positions and number of pinholes 15a formed in MPH mask 15, and the distance between adjacent pinholes 15a. At least one of the positions and number of pinholes 15a and the distance between adjacent pinholes 15a is an example of information on multiple pinholes 15a. Hereinafter, the aperture pattern information is also referred to as MPH information.

The positions of pinholes 15a affect the position of the object projected onto image sensor 16, and the sizes and number of pinholes 15a affect the blurring of the MPH image.

It should be noted that, for example, as long as multiple pinholes 15a are two or more pinholes, the number of multiple pinholes 15a is not limited to a particular number. In addition, the aperture pattern may differ, for example, for each MPH image capturing unit 11, for each protection target, and for each use scene. The use scene is a scene in which an image of a target that should be concealed, such as a face or the entire background, is captured.

It should be noted that the aperture pattern information is not limited to the information indicating, for example, the size and shape of the aperture as described above. The aperture pattern information may include point spread function (PSF). The PSF indicates the blurring aspects (degradation aspects) of an image because of a point source passing through the optical system when an image of the point source is captured and is a function denoting the intensity distribution when blurring occurs. In other words, the PSF is a function describing how light rays spread when an ideal point source passes through the optical system.

Thus, the aperture pattern information may include information on the pattern of pinholes 15a and information on the MPH image obtained according to the aperture pattern.

Image sensor 16 receives the light which has passed through MPH mask 15. In other words, image sensor 16 obtains an image (an MPH image) of an object by the light passing through pinholes 15a. The MPH image is obtained by the light passing through pinholes 15a. An obtained PH image differs according to, for example, the position and size of each pinhole 15a. Image sensor 16 obtains, as an MPH image, a superimposed image in which PH images are superimposed on top of each other (coded image). The MPH image can be an image that may be visually unrecognizable by people. However, through computer processing, it is possible to obtain information included in the image, such as an imaging target object and the surrounding environment of the target object.

The following descriptions are based on FIG. 1 again. Noise adder 12 adds noise to an MPH image obtained by MPH image capturing unit 11. For instance, noise adder 12 adds noise to the MPH image by image processing, the noise being determined according to the aperture pattern information on MPH mask 15. Noise adder 12 adds, for example, noise having the same frequency characteristics as the transmission frequency characteristics of MPH mask 15. In other words, noise adder 12 adds, for example, noise suitable for the aperture pattern of MPH mask 15.

The MPH image may have, for example, flat frequency characteristics (spatial-frequency characteristics). Thus, noise adder 12 adds, for example, noise having flat frequency characteristics to the MPH image. The noise having the flat frequency characteristics is noise (broadband noise) in a frequency band (spatial-frequency band) wider than a predetermined frequency band. In other words, the noise having the flat frequency characteristics is noise in which a frequency characteristic deviation is less than or equal to a threshold in the predetermined frequency band. The predetermined frequency band is a band based on the aperture pattern of MPH mask 15 and includes, for example, a low band and a high band higher than the low band. The predetermined frequency band at least overlaps the frequency band of the MPH image and may be, for example, a band including the entire frequency band of the MPH image. The broadband noise is noise in which, for example, the intensities of the frequency components of the predetermined frequency band fall within a predetermined range or noise in which variations in the intensities of the frequency components of the predetermined frequency band fall within a predetermined range.

The noise added by noise adder 12 may include at least one of salt-and-pepper noise, Laplace noise, white noise, pink noise, and noise that changes the output value (pixel value) of a portion of an MPH image to a fixed value (by the cutout method). In addition, the noise added by noise adder 12 may include at least one of scratch noise as seen on an old film, noise that masks (covers) a portion of an MPH image by random erasing, colored noise (for example, noise other than white noise), and frequency-wise unbalanced noise in which a frequency characteristic deviation exceeds a threshold.

It should be noted that restoration from an image to which sparse noise in the frequency space is added is easier than restoration from an image to which broadband noise in the frequency space is added. Thus, noise adder 12 does not add the sparse noise in the frequency space to an MPH image. For instance, noise adder 12 does not add impulse noise in the frequency space to an MPH image.

As illustrated in FIG. 2, noise adder 12 is embodied as, for example, image signal processor (ISP) 17. The sparse noise is, for example, noise containing frequency components in only one of the low band and the high band.

It should be noted that addition of noise by noise adder 12 is not limited to addition of noise by image processing. The noise added by noise adder 12 may be, for example, noise caused by hot pixels, noise caused by dead pixels, and shot noise. In this case, noise adder 12 may be included in MPH image capturing unit 11 (for example, image sensor 16). It should be noted that the hot pixels are the noise that causes a part of pixel values to be white while the dead pixels are the noise that causes a part of pixel values to be black.

The following descriptions are based on FIG. 1 again. Transmitter 13 outputs, to identification device 20, the MPH image to which the noise has been added by noise adder 12. Transmitter 13 outputs the noise added MPH image through wireless communication. However, transmitter 13 may output the noise added MPH image through wired communication. Transmitter 13 is an example of an outputting unit. It should be noted that hereinafter, the noise added MPH image is also referred to as a noise added image.

As illustrated in FIG. 2, transmitter 13 is embodied as communication unit 18 including a communication interface, such as an adapter, for transmitting a noise added image to identification device 20.

Identification device 20 identifies an object shown in the noise added image, by using a trained learning model (learned model). For instance, identification device 20 may detect an object shown in the noise added image, by using the learned model and output the result of detection. Detection of the object shown in the noise added image is an example of identification. The learned model is also referred to as an identifier.

Identification device 20 includes receiver 21, identifying unit 22, and outputting unit 23.

Receiver 21 communicates with sensing device 10 and training device 30. Receiver 21 receives the noise added image from sensing device 10 and receives the learned model from training device 30. Receiver 21 includes a communication interface, such as an adapter, for receiving various information items from sensing device 10 and training device 30.

By using the learned model, identifying unit 22 obtains information on the object shown in the noise added image (for example, a target object and the surrounding environment of the target object). For instance, identifying unit 22 identifies the object shown in the noise added image and obtains the position of the object shown in the noise added image. That is, the information on the object is the result of identification by the learned model and may include the existence or nonexistence of an object and the position of the object. In addition, the identification of the object may include, for example, detection of pixels showing an object.

Identifying unit 22 inputs the noise added image to the learned model, which is a model trained by training unit 33, and obtains output from the learned model as the result of the identification. The learned model trained by training unit 33 has better identification performance for the noise added image. Thus, by using the learned model, identifying unit 22 can suppress degradation of identification performance for the noise added image.

If for instance identification device 20 is mounted on an automobile, the object is, for example, a person, an automobile, a bicycle, or traffic lights. It should be noted that using the noise added image, identification device 20 may identify a predetermined type of objects or more than one type of objects. In addition, identification device 20 may identify an object for each category, including, for example, traveling objects including a person, an automobile, or a bicycle.

Outputting unit 23 outputs the result of the identification by identifying unit 22. Outputting unit 23 may present the result of the identification to a user. Outputting unit 23 includes, for example, a display device or a sound outputting device.

It should be noted that sensing device 10 and identification device 20 may be mounted on the same device. For instance, sensing device 10 and identification device 20 may be mounted on traveling objects, such as a vehicle and a robot, and may be mounted on fixed objects, such as a monitoring camera system.

Training device 30 creates a learned model used for identification device 20 to identify an object. Training device 30 includes MPH information obtainer 31, noise information obtainer 32, training unit 33, and transmitter 34. In addition, training device 30 may include a reception unit that receives input from the user. The reception unit is embodied as, for example, a button or touch panel and may be embodied as a device that receives input by, for example, sound.

MPH information obtainer 31 obtains MPH information (aperture pattern information) corresponding to the aperture pattern of MPH mask 15 of sensing device 10. For instance, MPH information obtainer 31 may obtain the aperture pattern information from sensing device 10 or obtain the MPH information by input from the user.

Noise information obtainer 32 obtains noise information indicating noise to be added to the MPH image by noise adder 12 of sensing device 10. For instance, noise information obtainer 32 may obtain the noise information from sensing device 10 or by input from the user.

Training unit 33 trains a learning model for identifying an object shown in a noise added image generated by noise adder 12. Training unit 33 trains the learning model by machine learning that uses a dataset generated using the MPH information obtained by MPH information obtainer 31 and the noise information obtained by noise information obtainer 32. In other words, training unit 33 trains the learning model by using the dataset. The learning model is an example of a machine learning model for identifying an object shown in an image on the basis of the image. The learning model is, for example, a machine learning model using a neural network, such as a deep learning network. However, other machine learning models may be used. For instance, the machine learning model may be a machine learning model using, for example, random forest or genetic programing.

It should be noted that the dataset includes a training image equivalent to the noise added image and ground truth information for the training image. The ground truth information is reference data in machine learning and is appropriately determined according to, for example, the uses of identification device 20. For instance, the ground truth information indicates the type of an object and the position of the object within the image. In addition, the dataset may be generated by, for example, training device 30 or other devices.

The image equivalent to the noise added image may be, for example, an image obtained by adding noise identified by the noise information obtained by noise information obtainer 32, to an MPH image captured by an image capturing device including MPH mask 15 having the same MPH information as the MPH information obtained by MPH information obtainer 31. In addition, if for instance the MPH information includes the PSF, the image equivalent to the noise added image may be an image obtained by adding noise identified by the noise information obtained by noise information obtainer 32, to an image generated by convolving a normal image with the PSF.

In addition, machine learning is achieved by, for example, back propagation (BP) in, for example, deep learning. Specifically, training unit 33 inputs a training image to a learning model which is not trained and obtains an identification result output by the learning model. Then, training unit 33 adjusts the learning model so that the identification result matches ground truth information. Training unit 33 improves the accuracy of identification by the learning model by repeating such adjustment for different training images and ground truth information items corresponding to the training images (e.g., thousands of training-image-and-ground-truth-information pairs).

Transmitter 34 outputs the learned model created by training unit 33 to identification device 20. Transmitter 13 includes a communication interface, such as an adapter, for transmitting the learned model to identification device 20. It should be noted that to output the learned model means to output information items, such as a network parameter and an operation algorithm (a machine learning algorithm) in the learned model. It should be noted that the algorithm is not limited to a particular algorithm and may be any existing algorithm.

Figure 3:
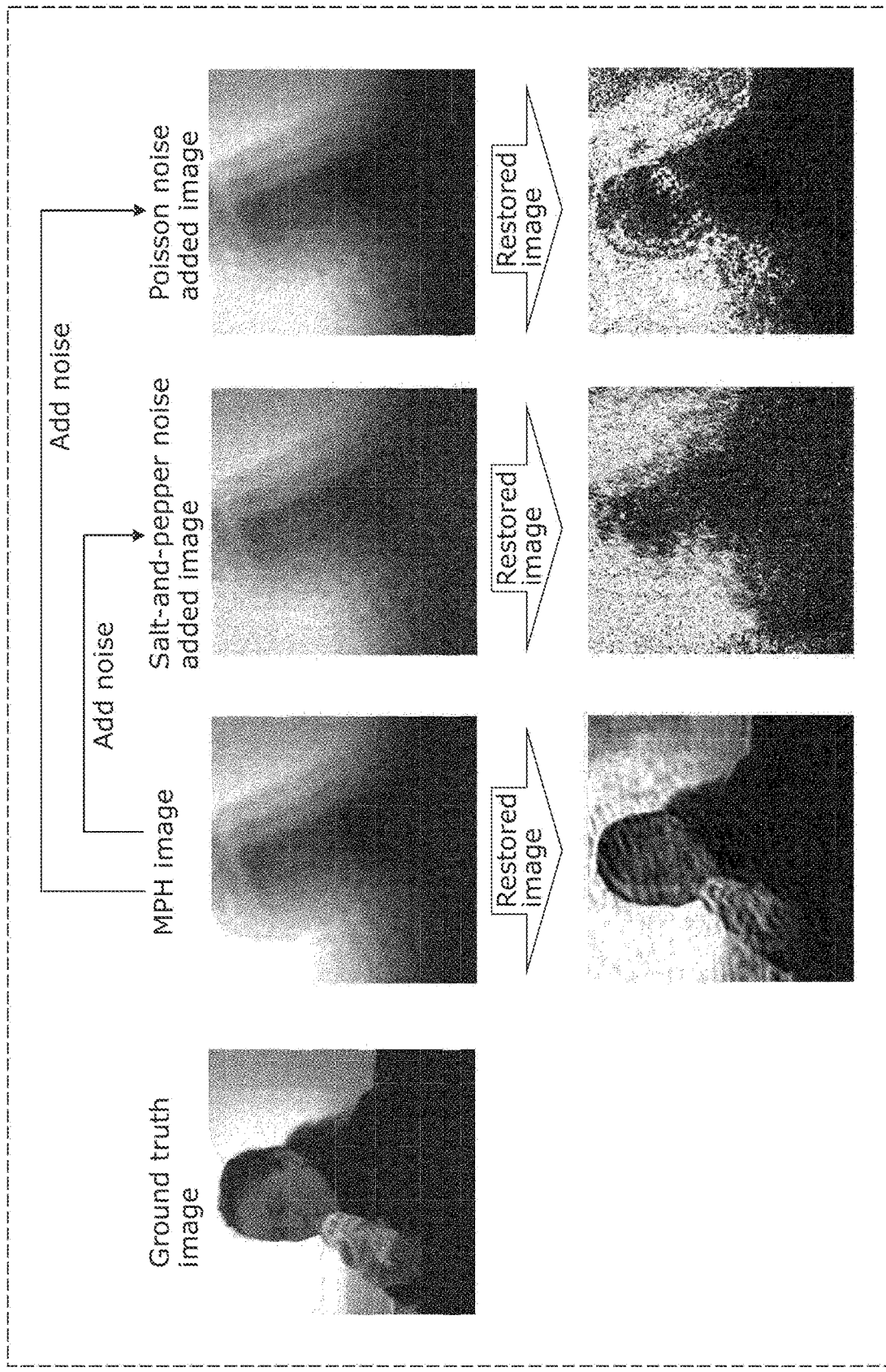
FIG. 3 is a figure to explain various images according to Embodiment 1.

Here, various images are described with reference to FIG. 3. FIG. 3 is a figure used to explain various images according to Embodiment 1.

FIG. 3 includes an MPH image of the target object (person) shown in the ground truth image (normal image), captured by MPH image capturing unit 11, and a salt-and-pepper noise added image and a Poisson noise added image, which are examples of noise added images, and restored images restored from the above-mentioned images. The restored images are obtained by, for example, performing restoration processing by the SelfDeblur method (Ren D, Zhang K, Wang Q, et al. Neural blind deconvolution using deep priors. Proceedings of the IEEE/CVF Conference on Computer Vision and Pattern Recognition. 2020) which is a neural network model that performs deblurring processing for an input image and outputs a deblurred image for the input image. The three restored images are restored by the same neural network model. The salt-and-pepper noise added image is a salt-and-pepper noise added MPH image. The Poisson noise added image is a Poisson noise added MPH image.

As illustrated in FIG. 3, from the ground truth image, it is possible to recognize that a person is drinking. On the other hand, the MPH image, the salt-and-pepper noise added image, and the Poisson noise added image may be images which are visually unrecognizable by people. It should be noted that by performing computer processing for the MPH image, the salt-and-pepper noise added image, and the Poisson noise added image, it is possible to obtain information contained in each image, such as the target object and the surrounding environment of the target object.

In the image restored from the MPH image, restoration is achieved to the level at which it is possible to recognize that the person is drinking. Thus, the MPH image may be restored to an image visually recognizable by people.

Meanwhile, in the images restored from the salt-and-pepper noise added image and the Poisson noise added image, it is not possible to recognize that the person is drinking. That is, in the restored images, restoration is not achieved to a level at which people can visually recognize the images. The salt-and-pepper noise added image and the Poisson noise added image are images to which broadband noise in a frequency band wider than a predetermined frequency band is added. Thus, the frequency components of the MPH image overlaps those of the noise in the predetermined frequency band, which makes it difficult to remove only the frequency components of the noise from the noise added image. Especially when convolutional signal conversion is performed as performed by a multi-pinhole camera, the broadband noise in the frequency space can make image restoration difficult.

Thus, by adding, to the MPH image, the broadband noise in the frequency band wider than the predetermined frequency band, it is possible to achieve an image from which it is difficult to restore a noise removed image in case of leakage.

It should be noted that when the noise added by noise adder 12 is the salt-and-pepper noise, that is, the noise information includes information indicating that the salt-and-pepper noise is to be added, training device 30 trains a learning model by using salt-and-pepper noise added images. In addition, when noise added by noise adder 12 is either the salt-and-pepper noise or the Poisson noise, that is, the noise information includes information indicating that either the salt-and-pepper noise or the Poisson noise is to be added, training device 30 trains a learning model by using salt-and-pepper noise added images and Poisson noise added images.

[1-2. Operation of Information Processing System]

Figure 4:
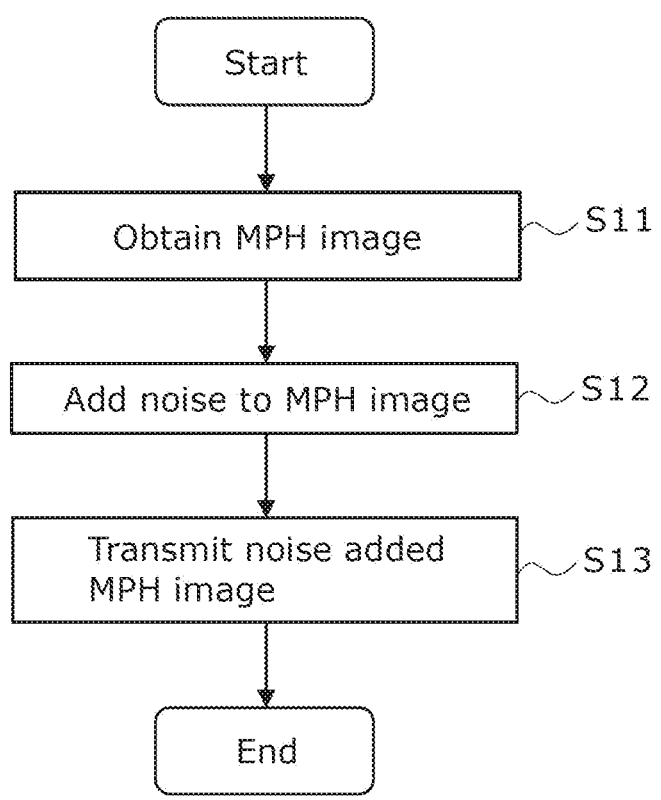
FIG. 4 is a flowchart illustrating operation of the sensing device according to Embodiment 1.

Operation of information processing system 1 having the above configuration is described with reference to FIGS. 4 to 6. Operation of sensing device 10 is described with reference to FIG. 4. FIG. 4 is a flowchart illustrating operation of sensing device 10 according to Embodiment 1.

As illustrated in FIG. 4, MPH image capturing unit 11 of sensing device 10 obtains an MPH image by capturing an image of a target object (S11). MPH image capturing unit 11 outputs the obtained MPH image to noise adder 12.

After obtaining the MPH image, noise adder 12 adds, to the MPH image, noise determined according to MPH information on MPH mask 15 at the time of capturing of the MPH image (S12). When the aperture pattern of MPH mask 15 is unchangeable, noise adder 12 reads noise suitable for the aperture pattern from storage (not illustrated) and adds the read noise to the MPH image. For instance, noise adder 12 adds the noise to the entire MPH image. However, noise adder 12 may add the noise to a portion of the MPH image. The noise to be added is pre-stored in the storage of sensing device 10. Noise adder 12 functions as an image obtainer that obtains an MPH image.

Noise adder 12 may store, in the storage, a noise added image which is a noise added MPH image. It should be noted that noise adder 12 does not have to store, in the storage, the MPH image before addition of the noise, that is, the MPH image captured by MPH image capturing unit 11. Noise adder 12 may overwrite the MPH image with the noise added image. If the MPH image is stored, noise adder 12 may remove the MPH image. In this manner, it is possible to suppress the MPH image from being leaked from sensing device 10.

Transmitter 13 transmits, to identification device 20, the MPH image to which the noise has been added by noise adder 12 (the noise added image) (S13). Transmitter 13 transmits, for example, the salt-and-pepper noise added image or the Poisson noise added image illustrated in FIG. 3 to identification device 20.

In this way, sensing device 10 of information processing system 1 generates the noise added image by adding the noise determined according to the MPH information to the MPH image. As already described with reference to FIG. 3, restoration from such a noise added image is more difficult than restoration from the MPH image. Thus, sensing device 10 can suppress image restoration in case of leakage of the noise added image.

Operation of training device 30 is described with reference to FIG. 5. FIG. 5 is a flowchart illustrating operation of training device 30 according to Embodiment 1. The operation illustrated in FIG. 5 is performed, for example, prior to the operation illustrated in FIG. 4.

Figure 5:
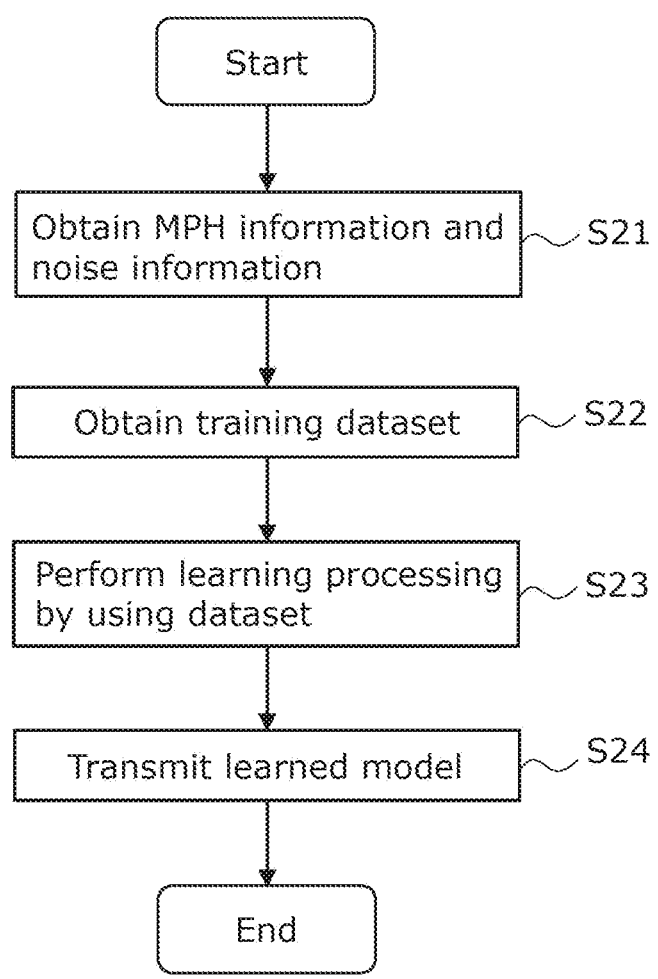
FIG. 5 is a flowchart illustrating operation of the training device of the information processing system according to Embodiment 1.

As illustrated in FIG. 5, training device 30 obtains MPH information and noise information regarding sensing device 10 (S21). Specifically, MPH information obtainer 31 obtains the MPH information, and noise information obtainer 32 obtains the noise information. It should be noted that when the pattern of pinholes 15a is exclusively associated with noise to be added, training device 30 just needs to obtain at least one of the MPH information and the noise information from an external device or by input from the user.

It should be noted that if the aperture pattern of pinholes 15a of MPH mask 15 is changeable, the MPH information includes information items corresponding to respective switchable aperture patterns.

Training unit 33 of training device 30 obtains a training dataset (S22). Training unit 33 obtains a dataset suitable for the MPH information and the noise information obtained in step S21. The dataset may be created by training unit 33 on the basis of the MPH information and the noise information. In addition, datasets are stored in training device 30, and training unit 33 may read the dataset suitable for the MPH information and the noise information obtained in step S21. In addition, training unit 33 may obtain the dataset from an external device (for example, a device that manages various datasets).

It should be noted that when the aperture pattern of pinholes 15a is changeable, training unit 33 may obtain datasets suitable for respective switchable aperture patterns.

Training unit 33 performs learning processing by using the dataset (S23). In step S23, training unit 33 trains a learning model by machine learning, by using the dataset. The learning processing is performed by, for example, the back-propagation. However, the method is not limited to the back-propagation, and the learning processing may be performed by any existing method.

Here, the noise added by noise adder 12 is broadband noise in the frequency space and impulse noise in the real space. Since the impulse noise in the real space has a small effect on training of the learned model, it is possible to suppress degradation of identification performance.

It should be noted that when the aperture pattern of MPH mask 15 is changeable, training unit 33 may perform the learning processing in step S23 for one learning model, by using datasets including training images to each of which a different type of noise is added. Alternatively, training unit 33 may perform learning processing to create learning models corresponding to the datasets. In this manner, even when the aperture pattern of MPH mask 15 is changed, that is, even when the noise added by noise adder 12 is changed, it is possible to suppress degradation of identification performance for an object shown in a noise added image.

Transmitter 34 transmits the learned model trained by training unit 33 to identification device 20 (S24). The processing in step S24 is performed, for example, prior to shipment of sensing device 10 from the factory.

Operation of identification device 20 is described with reference to FIG. 6. FIG. 6 is a flowchart illustrating operation of identification device 20 of information processing system 1 according to Embodiment 1.

Figure 6:
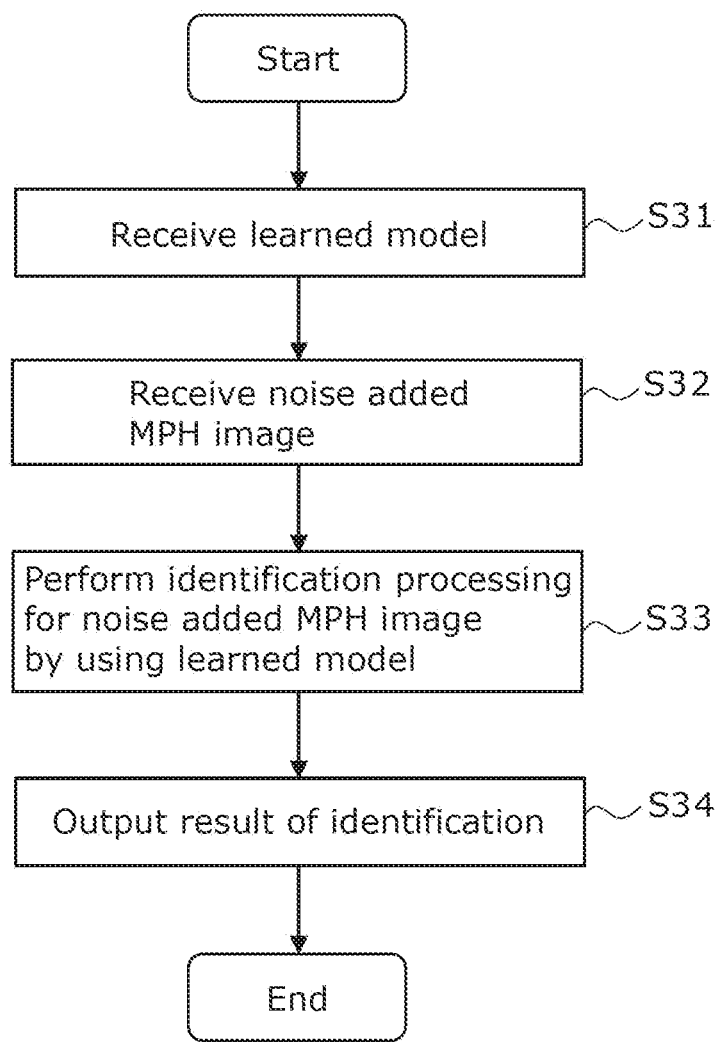
FIG. 6 is a flowchart illustrating operation of the identification device of the information processing system according to Embodiment 1.

As illustrated in FIG. 6, receiver 21 of identification device 20 receives the learned model transmitted from training device 30 in step S24 illustrated in FIG. 5 (S31). Receiver 21 stores the received learned model in storage (not illustrated). Receiver 21 functions as an obtainer.

Receiver 21 of identification device 20 receives the noise added MPH image (noise added image) transmitted from sensing device 10 in step S13 illustrated in FIG. 4 (S32). Receiver 21 stores the received noise added image in the storage (not illustrated).

Identifying unit 22 performs identification processing for the noise added MPH image by using the learned model (S33). Identifying unit 22 obtains, as the result of identification, output obtained by inputting the noise added MPH image to the learned model. Since the learned model was trained using training images suitable for the noise added by noise adder 12, the learned model can accurately perform the identification processing for the noise added image.

Outputting unit 23 outputs the result of the identification (S34). For instance, outputting unit 23 presents the result of the identification to the user by, for example, an image or sound.

As described above, identification device 20 of information processing system 1 performs the identification processing for the noise added MPH image by using the learned model which training device 30 trained using noise added MPH images. Thus, it is possible to suppress degradation of identification performance for the noise added MPH image.

Information processing system 1 according to Embodiment 1 can suppress both image restoration in case of leakage of a noise added image and degradation of identification performance due to noise.

Embodiment 2

[2-1. Configuration of Information Processing System]

Figure 7:
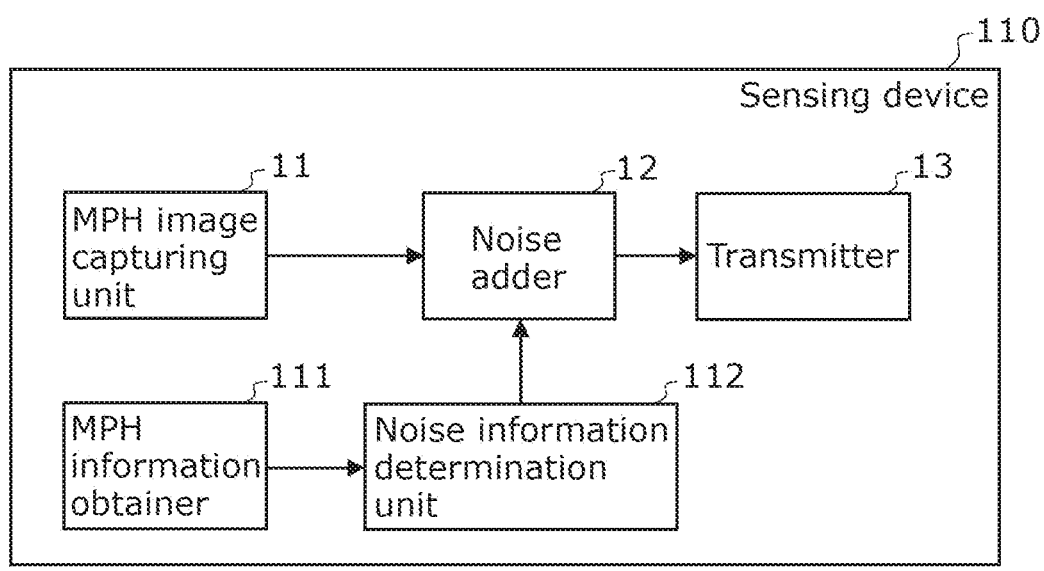
FIG. 7 is a block diagram illustrating a functional configuration of a sensing device according to Embodiment 2.

A configuration of information processing system 1 according to Embodiment 2 Is described with reference to FIG. 7. FIG. 7 is a block diagram illustrating a functional configuration of sensing device 110 according to Embodiment 2. Information processing system 1 according to Embodiment 2 includes sensing device 110 instead of sensing device 10. In this respect, information processing system 1 according to Embodiment 2 differs from information processing system 1 according to Embodiment 1. The following descriptions regarding sensing device 110 according to Embodiment 2 focus on differences from sensing device 10 according to Embodiment 1. In addition, the same or similar elements in sensing device 10 according to Embodiment 1 and sensing device 110 according to Embodiment 2 are assigned the same reference signs, and explanations are omitted or simplified.

As illustrated in FIG. 7, sensing device 110 includes MPH information obtainer 111 and noise information determination unit 112 in addition to the elements of sensing device 10 according to Embodiment 1.

MPH information obtainer 111 obtains MPH information (aperture pattern information) corresponding to the aperture pattern of multiple pinholes 15a. MPH information obtainer 111 is an example of an information obtainer.

According to the MPH information, noise information determination unit 112 selects noise to be added by noise adder 12. Noise information determination unit 112 determines noise to be added by noise adder 12, according to, for example, the frequency characteristics (the transmission frequency characteristics) of MPH mask 15. For instance, noise information determination unit 112 selects noise having the same frequency characteristics as those of the mask from two or more types of noise and adds the selected noise to an MPH image.

When for instance MPH mask 15 has flat frequency characteristics, noise information determination unit 112 determines, as the noise to be added to the MPH image, at least one of the salt-and-pepper noise and noise that changes the output value (pixel value) of a portion of the MPH image to a fixed value (by the cutout method). In addition, when the frequency characteristics (the transmission frequency characteristics) of MPH mask 15 indicate a high ratio of low-band frequency components, noise information determination unit 112 determines, as the noise to be added to the MPH image, noise having frequency characteristics indicating a high ratio of low-band frequency components, such as Laplace noise.

[2-2. Operation of Sensing Device]

Figure 8:
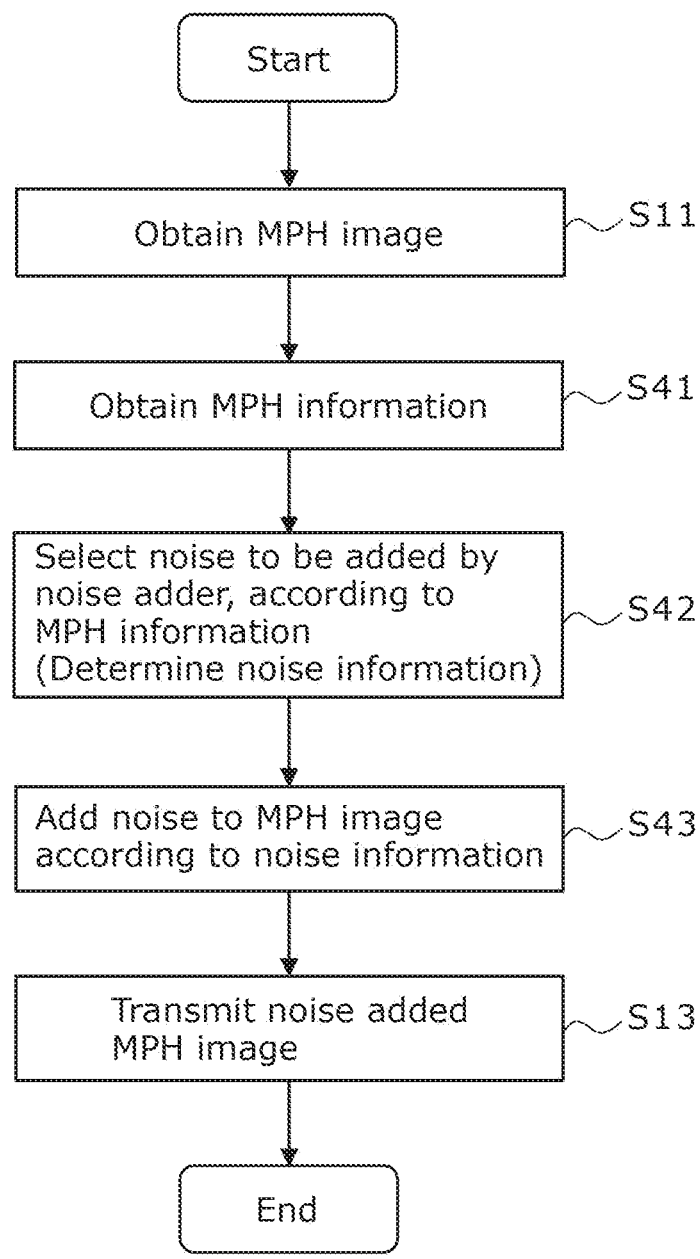
FIG. 8 is a flowchart illustrating operation of the sensing device according to Embodiment 2.

Operation of information processing system 1 having the above configuration is described with reference to FIG. 8. FIG. 8 is a flowchart illustrating operation of sensing device 10 according to Embodiment 2. It should be noted that the same or similar steps illustrated in FIGS. 4 and 8 are assigned the same reference sign, and explanations are omitted or simplified.

As illustrated in FIG. 8, MPH information obtainer 111 of sensing device 110 obtains MPH information on MPH mask 15 of MPH image capturing unit 11 (S41). When the aperture pattern of MPH mask 15 is fixed (unchangeable), MPH information obtainer 111 just needs to obtain the MPH information once, for instance. MPH information obtainer 111 outputs the obtained MPH information to noise information determination unit 112. MPH information obtainer 111 stores the obtained MPH information in storage (not illustrated).

Noise information determination unit 112 of sensing device 110 selects noise to be added by noise adder 12 from two or more types of noise, according to the MPH information obtained by MPH information obtainer 111 and determines noise information to be output to noise adder 12 (S42). When the frequency characteristics of MPH mask 15 based on the MPH information represent flat frequency characteristics in a frequency band including a low band and a high band higher than the low band, noise information determination unit 112 determines the noise information so that noise having flatter frequency characteristics is added. The noise having the flatter frequency characteristics includes, for example, the salt-and-pepper noise and noise that changes the output value (pixel value) of a portion of the MPH image to a fixed value (by the cutout method). The low band is an example of a first band, and the high band is an example of a second band.

In addition, when the frequency characteristics of MPH mask 15 based on the MPH information indicate a high ratio of low-band frequency components to high-band frequency components, noise information determination unit 112 determines the noise information so that noise having frequency characteristics indicating a high ratio of low-band frequency components is added. The noise having the frequency characteristics indicating the high ratio of low-band frequency components is, for example, Laplace noise.

When the frequency characteristics of MPH mask 15 based on the aperture pattern corresponding to the MPH information represent a wide frequency band including the first band and the second band higher than the first band, noise information determination unit 112 selects, as the noise to be added by noise adder 12, at least one of the salt-and-pepper noise and noise that changes the output value (pixel value) of a portion of the MPH image to a fixed value. When the intensities of the frequency components of the first band are higher than those of the frequency components of the second band, noise information determination unit 112 selects the Laplace noise as the noise to be added by noise adder 12.

It should be noted when the frequency characteristics represent the wide frequency band including the first band and the second band, a difference between the intensities of the frequency components of the first band and those of the frequency components of the second band is less than a predetermined value, for example. In addition, when the intensities of the frequency components of the first band are higher than those of the frequency components of the second band, the intensities of the frequency components of the first band are at least a predetermined value higher than those of the frequency components of the second band, for example. For instance, the above determination may be made by comparing the average value of the intensities of the frequency components of the first band and the average value of the intensities of the frequency components of the second band.

In step S42, according to the MPH information, noise information determination unit 112 may determine whether MPH mask 15 has flat frequency characteristics in the frequency band including the low band and the high band higher than the low band and whether the frequency characteristics of MPH mask 15 indicate a high ratio of low-band frequency components to high-band frequency components. Then, noise information determination unit 112 may determine the noise to be added, according to the results of determination. When for instance pinholes 15a are irregularly arranged and have different sizes and when the number of pinholes 15a (for example, the number of pinholes 15a within a predetermined area) is a predetermined number or greater, noise information determination unit 112 may determine that MPH mask 15 has flat frequency characteristics in the frequency band including the low band and the high band. In addition, when for instance the number of pinholes 15a (for example, the number of pinholes 15a within the predetermined area) is less than the predetermined number, noise information determination unit 112 may determine that many low-band frequency components are contained. In addition, noise information determination unit 112 holds a table in which MPH information is associated with mask information and may select, according to the table, noise to be added.

It should be noted that the noise information includes information identifying the noise to be added by noise adder 12. Noise Information determination unit 112 outputs the determined noise information to noise adder 12.

Noise adder 12 adds the noise to the MPH image according to the noise information (S43). Noise adder 12 reads, from the storage, the noise identified by the noise information and adds the read noise to the MPH image.

Since the noise suitable for the frequency characteristics of MPH mask 15 is added to the MPH image, it is possible to effectively generate a noise added image from which image restoration is difficult.

Variation of Embodiment 2

Figure 9:
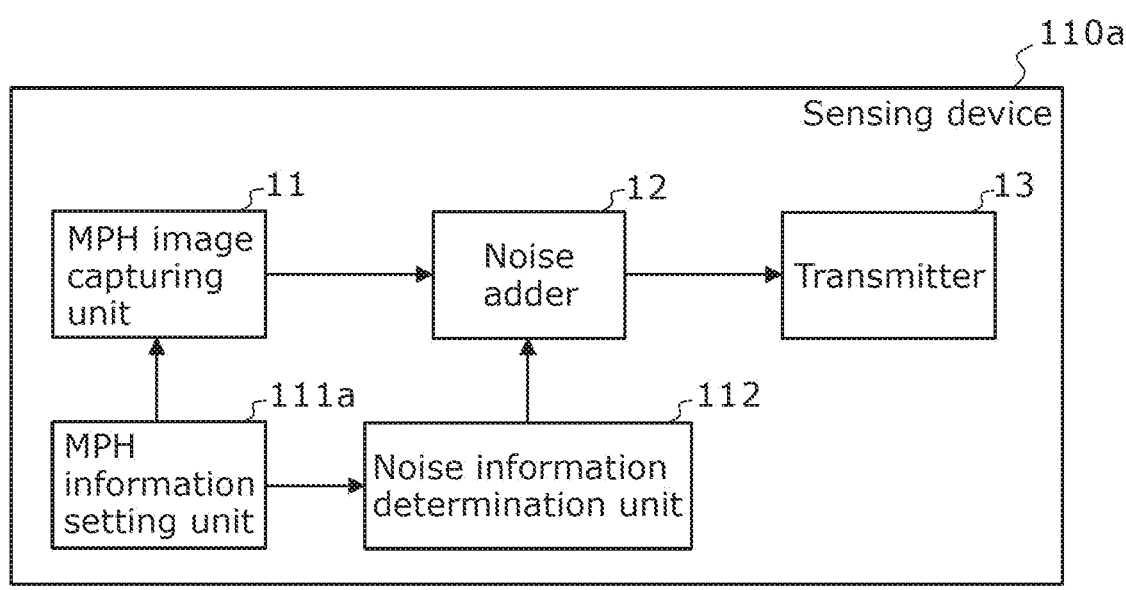
FIG. 9 is a block diagram illustrating a functional configuration of a sensing device according to a variation of Embodiment 2.

A configuration of information processing system 1 according to a variation of Embodiment 2 is described with reference to FIG. 9. FIG. 9 is a block diagram illustrating a functional configuration of sensing device 110a according to the variation. Information processing system 1 according to the variation includes sensing device 110a instead of sensing device 110. In this respect, information processing system 1 according to the variation differs from information processing system 1 according to Embodiment 2. The following descriptions regarding sensing device 110a according to the variation focus on differences from sensing device 110 according to Embodiment 2. In addition, the same or similar elements in sensing device 110 according to Embodiment 2 and sensing device 110a according to the variation are assigned the same reference sign, and explanations are omitted or simplified.

As illustrated in FIG. 9, sensing device 110a includes MPH information setting unit 111a instead of MPH information obtainer 111 of sensing device 110 according to Embodiment 2. In addition, in MPH image capturing unit 11 according to the variation, the aperture pattern of a mask (a mask pattern) is dynamically changeable. For instance, MPH image capturing unit 11 is switchable between a first aperture pattern (a first mask pattern) and a second aperture pattern (a second mask pattern) different from the first aperture pattern. That is, the aperture patterns of MPH image capturing unit 11 are switchable. MPH mask 15 of MPH image capturing unit 11 is, for example, a spatial light modulator (SLM) including, for example, a liquid crystal shutter. In this case, apertures are achieved by the transmissive portions of the liquid crystal shutter.

MPH information setting unit 111a controls the aperture pattern of MPH mask 15 of MPH image capturing unit 11. For instance, MPH information setting unit 111a performs control to switch between the aperture patterns of MPH mask 15. For instance, MPH information setting unit 111a changes the aperture pattern of MPH mask 15 as the time passes. For instance, MPH information setting unit 111a may switch between the aperture patterns at predetermined time intervals, according to operation by a user, or according to a preset schedule. The schedule includes information indicating the change of the aperture pattern with time.

In other words, MPH information setting unit 111a switches between the first aperture pattern and the second aperture pattern which are the aperture patterns of MPH mask 15, the second aperture pattern being different from the first aperture pattern. As long as there are two or more aperture patterns settable by MPH information setting unit 111a, the number of settable aperture patterns is not limited to a particular number. For instance, at least one of the positions and the number of apertures and the distance between adjacent apertures is different in the first aperture pattern and the second aperture pattern. MPH information setting unit 111a functions as a switcher.

MPH information setting unit 111a obtains MPH information by switching between the aperture patterns. In other words, MPH information setting unit 111a is also an MPH information obtainer.

MPH image capturing unit 11 controls MPH mask 15 (for example, SLM) to achieve the aperture pattern set by MPH information setting unit 111a.

Every time MPH information setting unit 111a switches between the aperture patterns, noise information determination unit 112 selects noise suitable for the updated aperture pattern. For instance, noise information determination unit 112 changes, with time, noise added to the MPH image. For instance, noise information determination unit 112 may hold information items on different types of noise, the number of which is greater than or equal to that of the aperture patterns settable by MPH information setting unit 111a, and set the different types of noise for the respective aperture patterns.

It should be noted that when the aperture patterns of MPH mask 15 of MPH image capturing unit 11 are switchable as described in the variation of Embodiment 2, training device 30, for instance, trains a learning model by using a dataset including training images suitable for the respective switchable aperture patterns.

Operation of information processing system 1 having the above configuration is described with reference to FIG. 10. FIG. 10 is a flowchart illustrating operation of sensing device 110a according to the variation. It should be noted that the same or similar steps illustrated in FIG. 8 in Embodiment 2 and FIG. 10 in the variation are assigned the same reference sign, and explanations are omitted or simplified.

As illustrated in FIG. 10, MPH information setting unit 111a of sensing device 110a sets MPH information on MPH mask 15 of MPH image capturing unit 11 (S51). MPH information setting unit 111a sets the MPH information on MPH mask 15 by selecting the aperture pattern that should be used at the moment, from a list including the aperture patterns. MPH information setting unit 111a outputs the MPH information to MPH image capturing unit 11 and noise information determination unit 112.

It should be noted that MPH information setting unit 111a may determine, prior to step S51, whether MPH information items should be switched. When determining that the switching should be performed, MPH information setting unit 111a may perform the processing in step S51. When determining that the switching is not necessary, MPH information setting unit 111a may perform the processing from step S11 without performing the processing in step S51 (without switching between the MPH information items). For instance, the determination may be performed according to the time that has elapsed since the switching between the MPH information items or according to whether input from a user has been received. In other words, step S51 is processing to update the MPH information on MPH mask 15 of MPH image capturing unit 11.

Then, MPH image capturing unit 11 obtains an MPH image by capturing an image of a target object according to the MPH information set by MPH information setting unit 111a (S11). MPH image capturing unit 11 switches between the aperture patterns of multi-pinhole mask 15 according to the MPH information set in step S51 and captures the image of the target object by using the updated aperture pattern.

MPH image capturing unit 11 outputs the obtained MPH image to noise adder 12. MPH image capturing unit 11 may output the obtained MPH image associated with the MPH information indicating the aperture pattern at the time of capturing the MPH image.

According to the MPH information, noise information determination unit 112 selects noise to be added by noise adder 12 (S42). When the MPH information is set in step S51, noise information determination unit 112, in step S42, abandons the previous MPH information and selects noise suitable for the newly set MPH information by using the newly set MPH information.

Since the aperture patterns of MPH mask 15 are switched, sensing device 110a can suppress image restoration from a leaked image, compared with when MPH mask 15 has only one aperture pattern.

It should be noted that the processing in step S42 may be performed before obtaining the MPH image. The processing in step S42 may be performed, for example, between step S51 and step S11.

Since the noise added to the MPH image changes with time, sensing device 110a can generate a noise added image from which image restoration is more difficult. In addition, a learning model is trained using images to which different types of noise are added according to the elapsed time. Accordingly, it is possible to suppress degradation of identification performance for noise added images to which the different types of noise are added according to the elapsed time.

Other Embodiments

The present disclosure is described on the basis of the embodiments and the variation (hereinafter, also referred to as just the embodiments). However, the present disclosure is not limited to the above embodiments. One aspect or two or more aspects of the present disclosure may include, within the spirit of the present disclosure, one or more embodiments obtained by making various changes envisioned by those skilled in the art to the above embodiments and one or more embodiments created by combining structural elements in the different embodiments.

For instance, in the examples of the above embodiments, noise added by the noise adder is one type of noise. However, the noise added by the noise adder may be a combination of at least two types of noise among the types of noise exemplified in Embodiment 1. A noise added image may be an MPH image to which at least two types of noise are added.

In addition, the MPH image capturing units in the embodiments may be lensless cameras. Instead of including a lens, a lensless camera includes a transmissive film on which multiple pinholes are printed or a specific pattern, such as a dot pattern, is printed. A portion of the transmissive film through which light passes is an example of an aperture. In addition, the transmissive film is an example of a mask.

In addition, the MPH image capturing units in the embodiments may be coded aperture cameras. The coded aperture cameras are cameras using coded apertures. In a camera using a coded aperture, a mask having a mask pattern (aperture shape) is disposed between an object and an image sensor. The coded aperture has a function to block incident light by the mask pattern, and the PSF of an image is controlled by the mask pattern. A portion of the mask through which light passes is an example of an aperture.

In addition, the shape of an aperture formed in the mask in the above embodiments is not limited to a particular shape. The aperture may have a circular or doughnut shape or may have a predetermined pattern. As long as at least one aperture is formed, the number of apertures formed in the mask is not limited to a particular number.

In addition, in the examples of the above embodiments, the identification device performs object identification processing using a learned model. However, the sensing device may perform the object identification processing. For instance, the identification device may be an internal component of the sensing device.

In addition, in the above embodiments, the training device trains the learned model so that the learned model outputs the result of identifying an object shown in a noise added image. However, for instance, the training device may train the learned model so that an image is restored from the noise added image. For instance, the training device may train a learning model so that when a noise added image is input to the learning model, the learning model outputs a ground truth image (normal image) for the noise added image. In this case, a dataset includes training images equivalent to noise added MPH images and ground truth images for the training images.

In addition, the order of the steps in each flowchart described in the above embodiments is an example. The order of the steps may be changed, and two or more steps may be performed in parallel. In addition, a part of the steps does not have to be performed.

In addition, the configuration of the functional blocks illustrated in each block diagram is a mere example. Two or more functional blocks may be incorporated into one functional block. One functional block may be divided into more than one functional block. A part of the function may be transferred from one functional block to another functional block. The same hardware or software may process, in parallel or on a time-sharing basis, the functions of two or more functional blocks having similar functions.

In addition, the devices of the information processing system may be incorporated into a single device or achieved by two or more devices. When the information processing system is made up of two or more devices, it does not matter how the structural elements of the information processing system are divided into the two or more devices. In addition, communication between the two or more devices may be wired or wireless communication. In addition, the communication standard used in communication is not limited to a particular communication standard.

In addition, the structural elements described in the embodiments may be embodied as software or may be typically embodied as an LSI, which is an integrated circuit. The structural elements may be made as individual chips, or a part or all of the structural elements may be incorporated into one chip. Although the LSI is mentioned above, the integrated circuit may be referred to as an IC, a system LSI, a super LSI, and an ultra LSI according to the degree of integration. In addition, circuit integration may be achieved not only by an LSI but also by a dedicated circuit or a general-purpose processor. A field programmable gate array (FPGA), which is programmable after manufacturing an LSI, or a reconfigurable processor in which the connections or settings of circuit cells inside an LSI are reconfigurable may be used. Furthermore, when a new technology of circuit integration that replaces the LSI is developed with the advancement of semiconductor technology or another derivative technology, the structural elements may be of course integrated by using the new technology.

Furthermore, the technology in the present disclosure may be the above program or a non-transitory computer-readable recording medium in which the above program is stored. In addition, it is a matter of course that the above program can be distributed via a transmission medium such as the Internet. For instance, the program and a digital signal containing the program may be transmitted via a network typified by a telecommunications line, a wireless or wired communication line, or the Internet or data broadcasting. In addition, another independent computer system may perform processing based on the program and the digital signal containing the digital signal in such a way that the above program and the digital signal containing the above program are stored in a recording medium and transferred to the independent computer system or the above program and the digital signal containing the above program are transferred to the independent system via, for example, the network.

In addition, in the embodiments, each of the structural elements may be dedicated hardware or may be caused to function by executing a software program suitable for the structural element. The structural element may be caused to function by a program executer, such as a CPU or a processor, reading and executing the software program stored in a recording medium, such as a hard disk or semiconductor memory.

INDUSTRIAL APPLICABILITY

The present disclosure is widely usable in devices that identify an object by using an image.

The invention claimed is:

1. An image processing device comprising:
an image obtainer that obtains a first captured image from a first image capturing device including a mask including at least one aperture;
an information obtainer that obtains aperture pattern information corresponding to a pattern of the at least one aperture;
a noise adder that adds, to the first captured image, noise determined according to the aperture pattern information; and
an outputting unit that outputs the first captured image to which the noise is added.

2. The image processing device according to claim 1, wherein the noise adder adds the noise in a frequency band wider than a predetermined frequency band to the first captured image.

3. The image processing device according to claim 1, further comprising:
a noise information determination unit that determines, according to the aperture pattern information, the noise to be added by the noise adder.

4. The image processing device according to claim 3, wherein when frequency characteristics of the mask based on the pattern of the at least one aperture corresponding to the aperture pattern information represent a wide frequency band including a first band and a second band higher than the first band, the noise information determination unit selects, as the noise to be added by the noise adder, at least one of salt-and-pepper noise or noise that changes an output value of a portion of the first captured image to a fixed value, and when an intensity of a frequency component of the first band is higher than an intensity of a frequency component of the second band, the noise information determination unit selects Laplace noise as the noise to be added by the noise adder.

5. The image processing device according to claim 1, wherein the mask is switchable between a first aperture pattern and a second aperture pattern different from the first aperture pattern, and
the image processing device further comprises a switcher that switches the pattern of the at least one aperture of the mask between the first aperture pattern and the second aperture pattern.

6. The image processing device according to claim 1, wherein the noise includes at least one of salt-and-pepper noise, Laplace noise, white noise, pink noise, or noise that changes an output value of a portion of the first captured image to a fixed value.

7. The image processing device according to claim 1, wherein the aperture pattern information includes at least one of point spread function (PSF), a size and a shape of the at least one aperture, or information on a plurality of apertures of the mask which are the at least one aperture.

8. The image processing device according to claim 1, wherein the first image capturing device is one of a multi-pinhole camera, a lensless camera, and a coded aperture camera.

9. An identification device comprising:
an image obtainer that obtains the first captured image to which the noise is added, from the image processing device according to claim 1; and
an identifying unit that identifies an object shown in the first captured image to which the noise is added, by using a machine learning model trained using a dataset including an image generated by adding noise determined according to the aperture pattern information to a second captured image obtained from a second image capturing device including the mask.

10. A method for training a machine learning model, the method comprising:
obtaining a dataset including an image generated by adding noise to a captured image obtained from an image capturing device including a mask including at least one aperture, the noise being determined according to aperture pattern information corresponding to a pattern of the at least one aperture; and
training the machine learning model by using the dataset obtained.

11. An image processing method comprising:
obtaining a captured image from an image capturing device including a mask including at least one aperture;
obtaining aperture pattern information corresponding to a pattern of the at least one aperture;
adding, to the captured image, noise determined according to the aperture pattern information; and
outputting the captured image to which the noise is added.

* * * * *